Nov. 5, 1968    H. O. NELSON    3,409,894
GRADIENT DELINEATORS

Filed Oct. 25, 1966    4 Sheets-Sheet 4

United States Patent Office 3,409,894
Patented Nov. 5, 1968

3,409,894
GRADIENT DELINEATORS
Herbert Oliver Nelson, The Old Manor House,
Southampton Road, Lymington, England
Filed Oct. 25, 1966, Ser. No. 589,248
7 Claims. (Cl. 346—7)

ABSTRACT OF THE DISCLOSURE

A gradient delineator or profile recorder which can be wheeled over the terrain to be surveyed in order to record its contour comprises a ball resolver, the drive to which is mounted on a pendulum and the take-off drives from which move with the body of the instrument according to the slope of the terrain. Means are provided for recording the information from the take-off drives, in the form of a record of the profile of the terrain.

The present invention relates to a gradient delineator for indicating and recording accurately the contour of the terrain over which it is moved. In particular it has been found to be of great assistance in obtaining records of the contours of beaches in coastal areas where such contours are being constanly changed by the tires.

According to this invention a gradient delineator for mounting on a wheeled carriage comprises two driving means respectively for moving a record strip longitudinally and for moving a recording instrument transversely of the record strip, a ball resolver provided with a ball which is rotated by a drive from a wheel of the carriage and two take-off drives from the ball resolver for transmitting movement to the means for moving the record strip and the recording instrument, respectively in accordance with the horizontal and vertical components of the travel of the carriage, the take-off drives from the ball resolver being changed in position relative to the drive to the ball resolver under the control of a pendulum. Thus, as the setting of the pendulum relative to the ball-resolver changes so does the speed of the two take-off drives change.

In one form of apparatus according to this invention a carriage consisting of a flat platform carried by a front wheel and a rear wheel has mounted thereon a housing in which is located a ball resolver. This ball resolver comprises a ball which is suitably supported and is rotatable about a horizontal axis. This ball is rotated by a roller which is rotated about its axis by an input actuating shaft driven through a suitable gearing by rotation of one of the road wheels of the carriage so that the ball is rotated in a constant relationship to the rotation of the said road wheel. The gearing may include a belt drive and preferably also includes a free-wheel or one-way clutch device so that record of the contour of the terrain can only be made by forward movement of the carriage.

Arranged about the ball at a convenient angle to the axis of rotation thereof is a cage which carries in bearings two rotatable motion transmitting rollers which engage the ball and are rotatable thereby. The axes of these rollers are in the same plane but are normal one to the other. Arranged diametrically opposite these motion transmitting rollers are two idler rollers which are spring pressed against the ball and which have their axes parallel to the motion transmitting rollers opposite thereto.

The position of this cage relative to the axis of rotation of the ball is controlled by a pendulum which is preferably damped against vibratory movement by being located in or extending downwardly into a chamber, preferably fluid tight, containing oil or other suitable liquid. The two motion transmitting rollers serve to transmit movement to two separate trains of gearing one of which rotates a drum onto which a record strip is wound from a second drum parallel thereto. The other train of gearing transmits motion to a worm which extends transversely of the record strip and serves to move a recording instrument across the record strip. As the carriage is tilted longitudinally during its travel, the distances between the axis of rotation of the ball and the rollers are varied. Thus the roller which transmits movement to the record strip conveys a movement corresponding to the horizontal component of the movement of the carriage. The other roller conveys movement corresponding to the vertical movement of the carriage to the recording instrument which thus travels to and fro across the record strip to trace a profile corresponding in form to the contour of the path of travel which has been traversed by the carriage.

The pendulum can, for example, act on a pivotally mounted shaft connected by gearing to a wheel of the carriage and which carries the roller.

In some cases the means for transmitting movement from a road wheel to the ball or from the ball to the record strip or the recording instrument may include a flexible drive.

Preferably the housing may be fluid tight so that the delineator may be operated under water and the oil container may be incorporated in said heating.

The invention will now be described, by way of example only, in the accompanying drawings of which:

Figure 1:
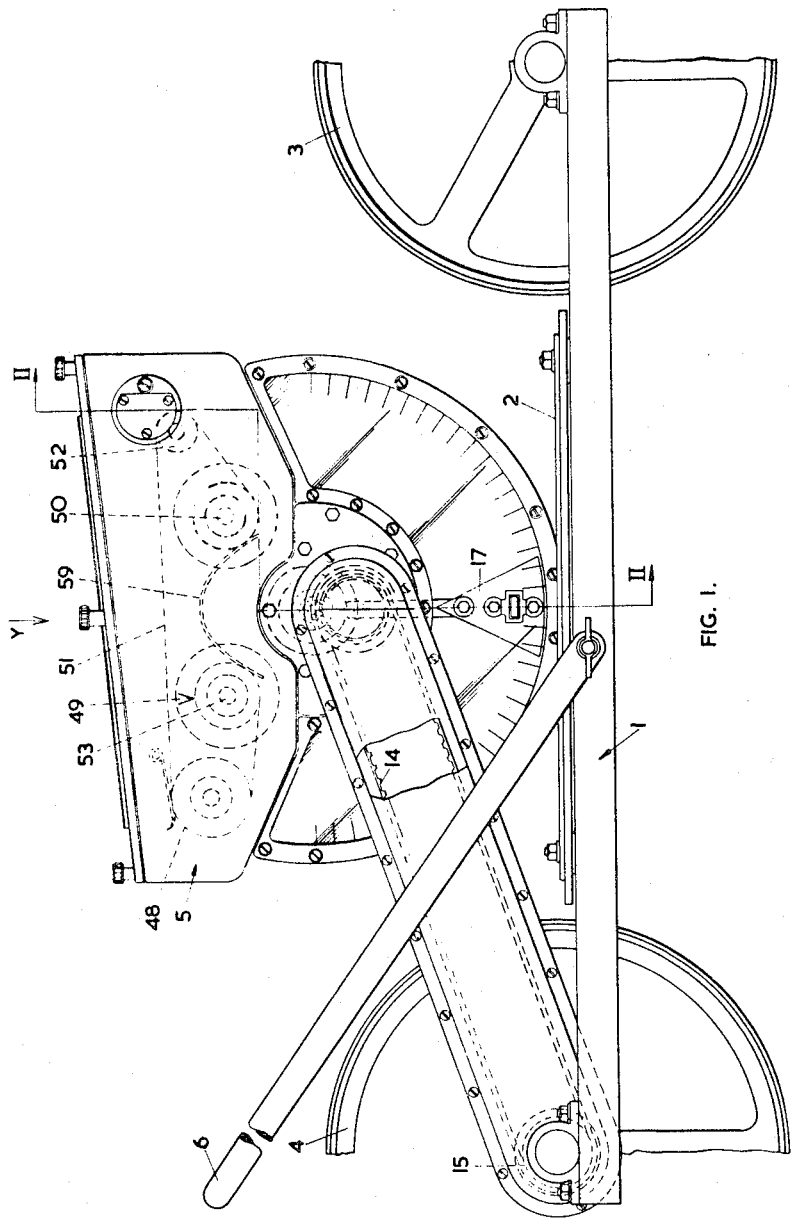
FIGURE 1 is a side view of one form of gradient delineator.

As seen in FIGURE 1 a carriage 1 consists of a flat platform 2 mounted between a front wheel 3 and a rear wheel 4 and carrying a housing 5. To propel the carriage 1 a handle 6 is secured thereto, additionally a freely suspended pendulum (not shown) may be mounted on the carriage above a line marked longitudinally of the carriage 1 to assist an operator in keeping the carriage upright during use. A distance recorder (also not shown) is mounted on the carriage and is actuated by a pin carried by the rear wheel 4.

Figure 2:
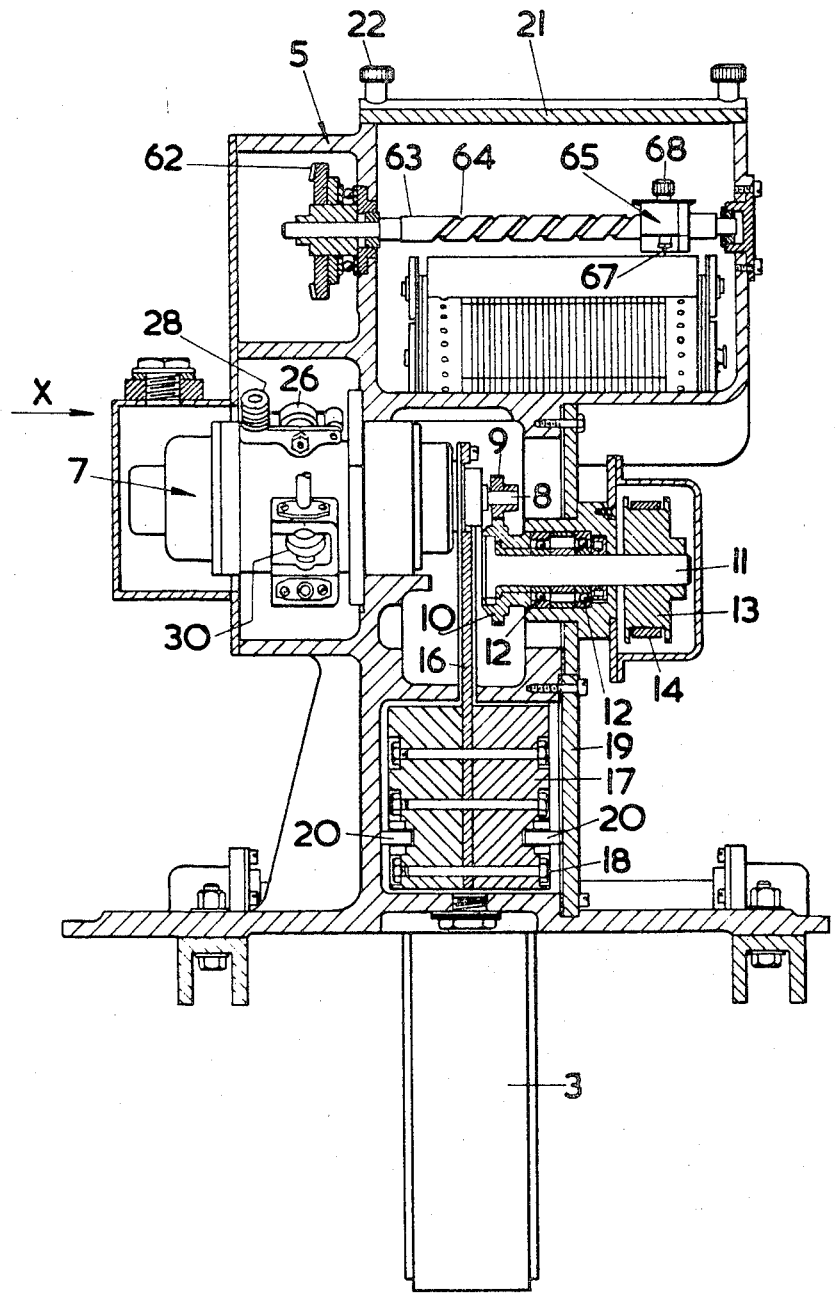
FIGURE 2 is a sectional view taken along the line II—II of FIGURE 1.

Referring to FIGURES 1 and 2 the housing 5 has secured therein a ball resolver generally indicated at 7. This ball resolver 7 has an input shaft 8 on which is mounted a gear wheel 9 in engagement with a gear wheel 10 secured at one end of a driven shaft 11 mounted in bearings 12 in the housing 5. At the other end of this driven shaft 11 is a pulley wheel 13 rotated by a toothed belt 14 which is itself rotated by a pulley wheel 15 fixed to the rear wheel 4 of the carriage 1. Thus the input shaft 8 of the ball resolver 7 is rotated as the carriage 1 is pushed along the ground being recorded. Incorporated in the drive from the rear wheel 4 to the input shaft 8 of the ball resolver 7 is a free wheel device such as a sprag clutch (not shown) so that the input shaft 8 is only rotated when the carriage 1 is moving forward. A pendulum 16 is mounted to rotate about the axis of the ball resolver 7 and has at its lower end a weight 17 which moves in a partly oil filled damping chamber 18 in the housing 5. One side wall 19 of this housing is made of a transparent plastics material suitably marked so that inclinations of the pendulum can be readily seen and measured. Guide wheels 20 carried by the weight 17 restrain sideways movement thereof to minimise friction in the ball resolver 7 should the carriage 1 be tilted transversely. The top of the housing 5 is closed by a toughened glass sheet 21 secured to the housing 5 by screw fasteners 22 in a water tight manner.

Figure 3:
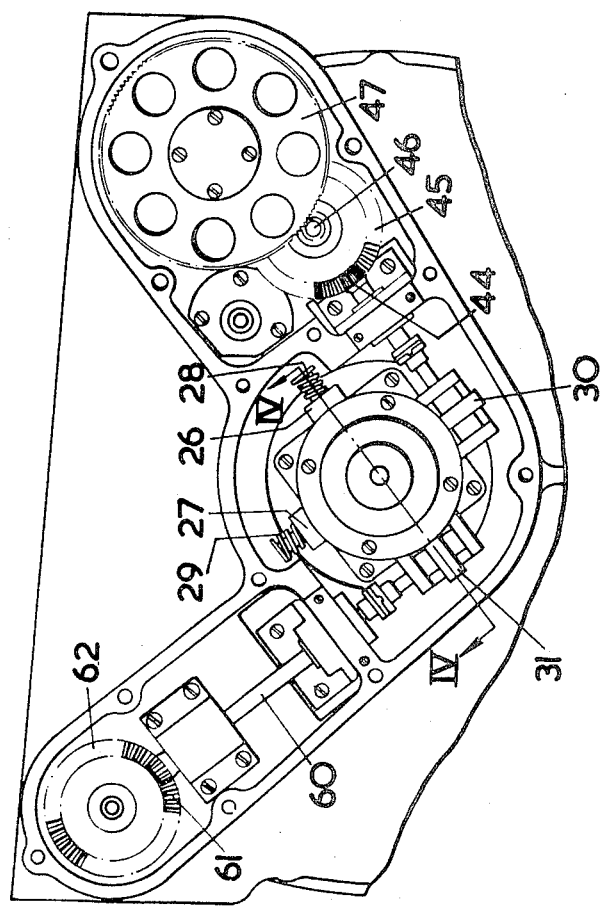
FIGURE 3 is a part view as seen in direction of arrow X in FIGURE 2.
Figure 4:
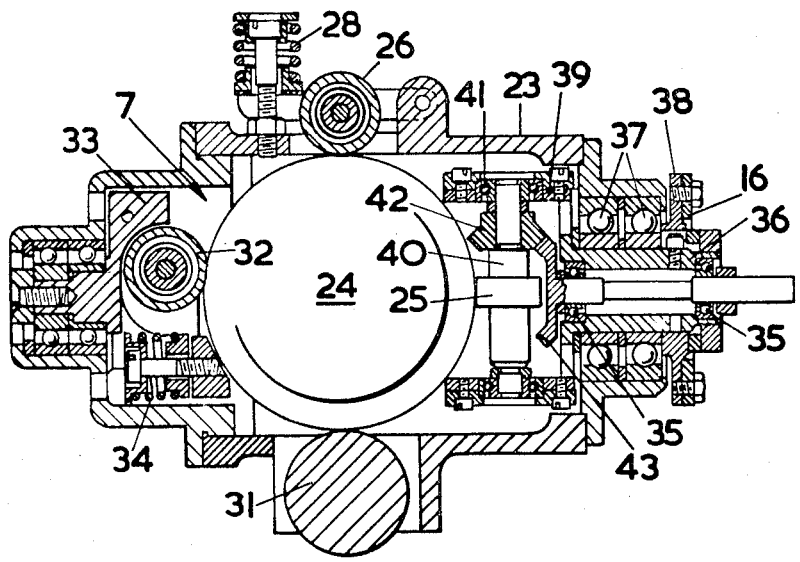
FIGURE 4 is a sectional view of the ball resolver taken along the line IV—IV of FIGURE 3.
Figure 5:
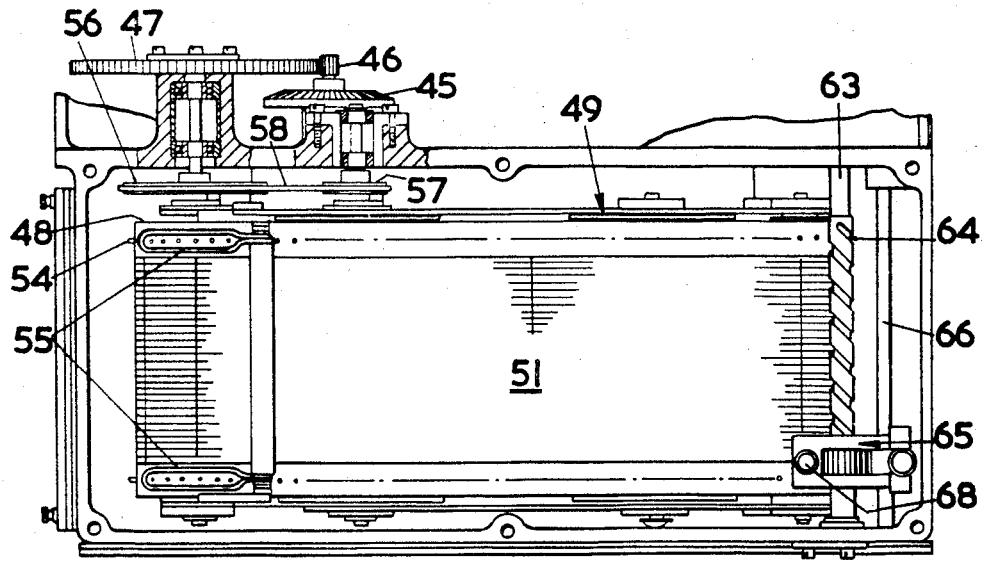
FIGURE 5 is a part view as seen in direction of arrow Y of FIGURE 1.

As seen in FIGURES 3 and 4 the ball resolver 7 comprises a casing 23 containing a ball 24 supported between six rollers namely a drive roller 25; two idler rollers 26, 27 which are pressed by springs 28, 29 against the ball 24; a horizontal movement roller 30; a vertical movement roller 31; and a castor idler roller 32. The horizontal and vertical movement rollers 30, 31 constitute the previously mentioned take-off drives. The two idler rollers, 26, 27 the horizontal movement roller 30 and the vertical movement roller 31 are arranged with their axes equally spaced and lying in a common plane perpendicular to the axis of the input shaft 8. A support member 33 is rotatably mounted in the casing 23 co-axially with the input shaft 8 and carries the castor idler roller 32 so that it contacts the ball 24, under the pressure of a spring 34, to one side of the position diametrically opposite the point of contact between the drive roller 25 and the ball 24. Thus when the ball 24 is revolved by the drive roller 25 the support member 33 will rotate until the axes of the castor idler roller 32 and the drive roller 25 are parallel. The input shaft 8 is mounted in bearings 35 in a hollow shaft 36 which is itself mounted in bearings 37 in the casing 23. At the end of the hollow shaft 36 outside the casing 23 is a flange 38 to which the pendulum 16 is bolted. To the other, inner, end of this hollow shaft 36 is fixed a cage 39 which supports a short shaft 40 in bearings 41 with its axis perpendicular to the axis of the hollow shaft 36. On this short shaft 40 is mounted the drive roller 25 and a bevel gear 42 engaged by a bevel gear 43 secured at the inner end of the input shaft 8. Thus the drive roller 25 is rotatable by the rear wheel 4 of the carriage 1 through the input shaft 8 and the position of its axis of rotation relative to the casing 23 is determied by the position of the pendulum 16. The horizontal movement roller 30 is connected through bevel gearing, 44, 45 FIGURES 3 and 5, and spur gearing 46, 47 to a drive drum 48 of a strip record device 49. This device 49 FIGURES 1 and 5, comprises a wind-off spool 50 which supplies paper record strip 51 over an idler drum 52 and over the drive drum 48 to a wind-on spool 53. The paper strip 51 is perforated along its edges so that pegs 54 carried by the drive drum 48 can engage therein to prevent slip between the drive drum 48 and the paper strip 51. Springs 55 press on the paper strip 51 to ensure engagement of the pegs 54 in the perforations. The wind-on spool 53 is driven from the drive to the drive drum 48 by pulley wheel 56, 57 and a pulley belt 58. This belt drive allows the belt 58 to slip to allow for the variations in the diameter of paper strip 51 on the wind-on spool 53. An arcuate leaf spring 59 engages the paper strip 51 on the spools 50, 53 in order that the paper strip 51 will be in tension between the drive drum 48 and the idler drum 52. The vertical movement roller 31, FIGURES 2, 3 and 5, is connected through a shaft 60 and bevel gears 61, 62 to a spindle 63, provided with a helical groove 64 to move a recording instrument 65, mounted on the spindle 63 and on a guide rod 66, axially along the spindle 63 as it is rotated by the vertical movement roller 31. The recording instrument 65 carried on the spindle has a pen 67 or other suitable marker which engages the paper strip 51 as it passes over the idler drum 52. By means of a knob 68 the marker 67 can be raised from the paper strip 51 whilst the paper strip 51 is removed or fitted to the record device 49.

In operation to survey a stretch of ground a fresh strip of paper 51 is placed in the housing 5 with the bulk of the paper on the wind-off spool 50 and the leading end firmly secured on the wind-on spool 53 and with the pegs 54 on the drive drum 48 engaging in the perforations. The recording instrument 65 is then set in a suitable position across the paper 51, e.g. if the carriage 1 is to be moved from the sea edge up a beach then the recording instrument 65 would be set at the right hand edge of the paper 51. Keeping the carriage 1 upright it is then pushed at a substantially constant speed over the ground to be surveyed keeping to as straight a line as possible.

When the carriage 1 is propelled over level ground the input shaft 8 of the ball resolver 7 is rotated anticlockwise as seen from the right of the carriage 1. The drive roller 25 occupies the position seen in FIGURE 4 and the ball 24 revolves on an axis between the vertical movement roller 31 and the oposite idler roller 26, thus the vertical movement roller 31 does not rotate and the recording instrument 65 remains stationary on the spindle 63. The horizontal movement roller 30 is contacting the ball 24 at the maximum distance from its axis of rotation and the said roller 30 is therefore rotating at its maximum speed, for a given carriage speed. This rotation of the horizontal movement roller 30 moves the paper strip 51 rearwards on the carriage 1.

If the carriage 1 is pushed uphill the pendulum 16 hangs vertically downwards, due to gravitational forces, whilst the casing 23 of the ball resolver 7 rotates anticlockwise as seen from the right of the carriage 1. Consequently the axis of rotation of the ball 24 relative to the casing 23 changes and the speed of rotation of the horizontal movement roller 30 is reduced, since its point of contact with the ball 24 is at a reduced radius from the axis of rotation of the ball 24. Also the vertical movement roller 31 is rotated anticlockwise as seen in FIGURE 4, since its point of contact with the ball 24 is no longer at the ball's axis of rotation, and as a result the recording instrument 65 is moved to the left of the carriage 1. The decrease in speed of the horizontal movement roller 30 and the increase in speed of the vertical movement roller 31 varies in proportion with inclination of the ground.

Movement of the cariage 1 downhill causes the casing 23 to revolve clockwise as seen from the right of the carriage 1 and thus alter the the angle of rotation of the ball 24 relative to the casing 23. The horizontal movement roller 30 is rotated at a speed reduced from its speed when the carriage 1 is horizontal and the vertical movement roller 31 is rotated clockwise as seen in FIGURE 4 to move the recording instrument 65 to the right of the carriage 1.

The paper strip 51 moves past the recording instrument 65 an amount directly proportional to the true horizontal movement of the carriage 1 and *not* an amount proportional to the distance moved along the ground, which is recorded by the distance recorder. Thus the graph traced out on the paper strip 51 shows a true section of the ground surveyed.

If the contour of the ground is such that its height is greater than the height represented by movement of the marker 67 across the paper 51, then as the marker 67 approaches the edge of the paper strip 51 the carriage 1 is stopped and the marker 67 returned to the opposite side of the paper strip 51. Alternatively different gear ratios can be employed in the drive between the vertical movement roller 31 and the spindle 63. The particular ratio selected will be chosen according to the terrain.

The gradient delineator may be used in any suitable vehicle such as a four wheeled vehicle. When mounted in such a vehicle it is preferable that the housing containing the ball resolver and the damped pendulum is kept upright.

What I claim is:

1. A gradient delineating apparatus comprising a wheeled carriage, a recording device mounted on the carriage to maintain a substantially fixed orientation of the recording device in relation to the carriage, the said recording device comprising, a recording instrument, means for moving a record strip longitudinally, and means for moving said recording instrument transversely of said record strip, a ball resolver comprising a ball freely mounted for rotation round any desired axis, drive means operatively connected to a wheel of the carriage, said drive means making frictional contact with the ball to rotate said ball round an axis at right angles to the radius from the center of the ball to the drive means, two take-off drives from the ball for transmitting movement to the means for moving the record strip and the recording instrument respectively in accordance with the horizontal and vertical components of the travel of the carriage, and a pendulum operatively connected to the drive means for maintaining the axes of rotation of the ball at a constant angle relative to the pendulum whereby the positioning of the take-off drives from the ball relative to the said axis of rotation represents any deviation of the carriage from the horizontal in the direction of travel.

2. A gradient delineator according to claim 1 wherein movement of the pendulum is damped.

3. A gradient delineator according to claim 1 including two spools for carrying a said record strip thereon and coiling said strip therearound, and drive and idler drums over which the strip can be passed, the drive drum being provided with pegs for engaging in perforations in the strip and also provided with a drive from one of the take-off drives thereby to rotate in accordance with the horizontal component of movement of the carriage.

4. A gradient delineator according to claim 1 wherein the recording instrument includes a marker and is mounted on a spindle in engagement with a helical groove formed therein so that rotation of the spindle in one or other direction by the appropriate take-off drive causes the recording instrument to move transversely of the record strip.

5. A gradient delineator according to claim 1 mounted on a carriage having only two wheels so that the carriage can be swung to keep the pendulum vertical.

6. A gradient delineating apparatus having
 (a) a wheeled carriage,
 (b) a recording device mounted on the carriage to maintain substantially fixed orientation of the recording device in relation to the carriage, and comprising means for moving a record strip and means for moving a recording instrument transversely of the movement of the record strip,
 (c) a ball resolver comprising a ball freely mounted for rotation round any desired axis lying in a plane which contains the direction of movement of the carriage during normal use, a drive means and two take-off means all in frictional contact with the ball and positioned at locations such that the radii of the ball from these locations are at right angles to each other, the two take-off means being mounted on shafts lying in the said plane and the drive means being mounted on a shaft which, when the apparatus is on level ground, is parallel to the shaft of one of the take-off means,
 (d) a drive between at least one of the wheels of the carriage and the shaft of the said drive means to rotate the said shaft at a speed proportional to the speed of the carriage,
 (e) a drive between the shaft of the said one of the take-off means and the means for moving the record strip,
 (f) a drive between the shaft of the other take-off means and the means for moving the recording instrument,
 (g) a pendulum mounted to swing in the said plane or a plane parallel thereto and which is connected to the shaft of the said drive means whereby the axis of this shaft swings relatively to the wheeled carriage when the wheeled carriage tilts upwardly or downwardly in the direction of travel, and
 (h) damping means for the pendulum.

7. A gradient delineating apparatus according to claim 6 wherein the carriage has only two wheels so that the carriage can be swung laterally to keep the pendulum vertical.

References Cited
UNITED STATES PATENTS

| | | | |
|---|---|---|---|
| 670,594 | 3/1901 | McCartney | 33—141.5 |
| 2,544,587 | 3/1951 | Cloud | 235—61 X |
| 2,598,096 | 5/1952 | Bailly | 346—8 |
| 2,607,996 | 8/1952 | Moyer | 33—141.5 |

RICHARD B. WILKINSON, *Primary Examiner.*

J. W. HARTARY, *Assistant Examiner.*